United States Patent [19]

Hanna

[11] Patent Number: 5,351,740

[45] Date of Patent: Oct. 4, 1994

[54] LOCKING MEANS AND PANEL ASSEMBLY INCORPORATING SUCH LOCK MEANS

[75] Inventor: Ronald D. Hanna, Ajax, Canada

[73] Assignee: G. D. Hanna Incorporated, Don Mills, Canada

[21] Appl. No.: 911,844

[22] Filed: Jul. 10, 1992

[30] Foreign Application Priority Data

Jul. 12, 1991 [CA] Canada ................... 2046976

[51] Int. Cl.⁵ .............................................. A47G 5/00
[52] U.S. Cl. ...................... 160/135; 52/511;
52/775; 248/243; 403/316; 403/330
[58] Field of Search .............. 160/135, 351, 229.1;
52/508, 511, 239, 775, 764, 489, 483; 248/243,
220.2, 221.3, 224.4, 225.2; 403/13, 354, 316,
330, 326; 256/24

[56] References Cited

U.S. PATENT DOCUMENTS

| | | | |
|---|---|---|---|
| 836,045 | 11/1906 | Melchior | 248/243 |
| 2,855,037 | 10/1958 | Stiffel | 160/135 |
| 2,881,877 | 4/1959 | Olsen | 52/489 |
| 3,224,153 | 12/1965 | Berman et al. | 52/775 |
| 3,263,821 | 8/1966 | Klene et al. | 248/243 X |
| 3,627,247 | 12/1971 | Krikorian | 248/243 |
| 3,895,774 | 7/1975 | Sharp | 248/243 |
| 4,134,564 | 1/1979 | Hanna | 160/351 X |
| 4,154,419 | 5/1979 | Breidenbach | 248/243 |
| 4,222,542 | 9/1980 | Wilson et al. | 248/243 |
| 5,004,198 | 4/1991 | Jager | 248/243 X |

Primary Examiner—David M. Purol
Attorney, Agent, or Firm—Weingarten, Schurgin, Gagnebin & Hayes

[57] ABSTRACT

A new attachment plate is provided for securing components of panel assemblies to a mounting post, the attachment plate incorporating a securing hook together with a locking tab. The attachment plate includes a projecting hook which mates with a slot in a mounting post structural member. The hook is of a lesser length than the slot in the post, and a further projection as a locking tab is provided on the attachment plate which also enters the slot and restrains reversed relative movement between the plate hook and the post slot, so as to limit or prevent undesired disassembly of a panel from the post. The application of an upward impact to the plate causes a cam surface on the locking tab to contact the upper end of the mounting post slot. This deflects the locking tab out from the slot, to enable removal of the hook from the slot, for panel disassembly from the post. Also provided is a hooked supporting plate incorporating pairs of flexible presser tabs, to compensate for manufacturing tolerances. The laterally extending tabs engage outer surfaces of the mounting post and provide stabilization of a multi-panel assembly against sway.

9 Claims, 6 Drawing Sheets

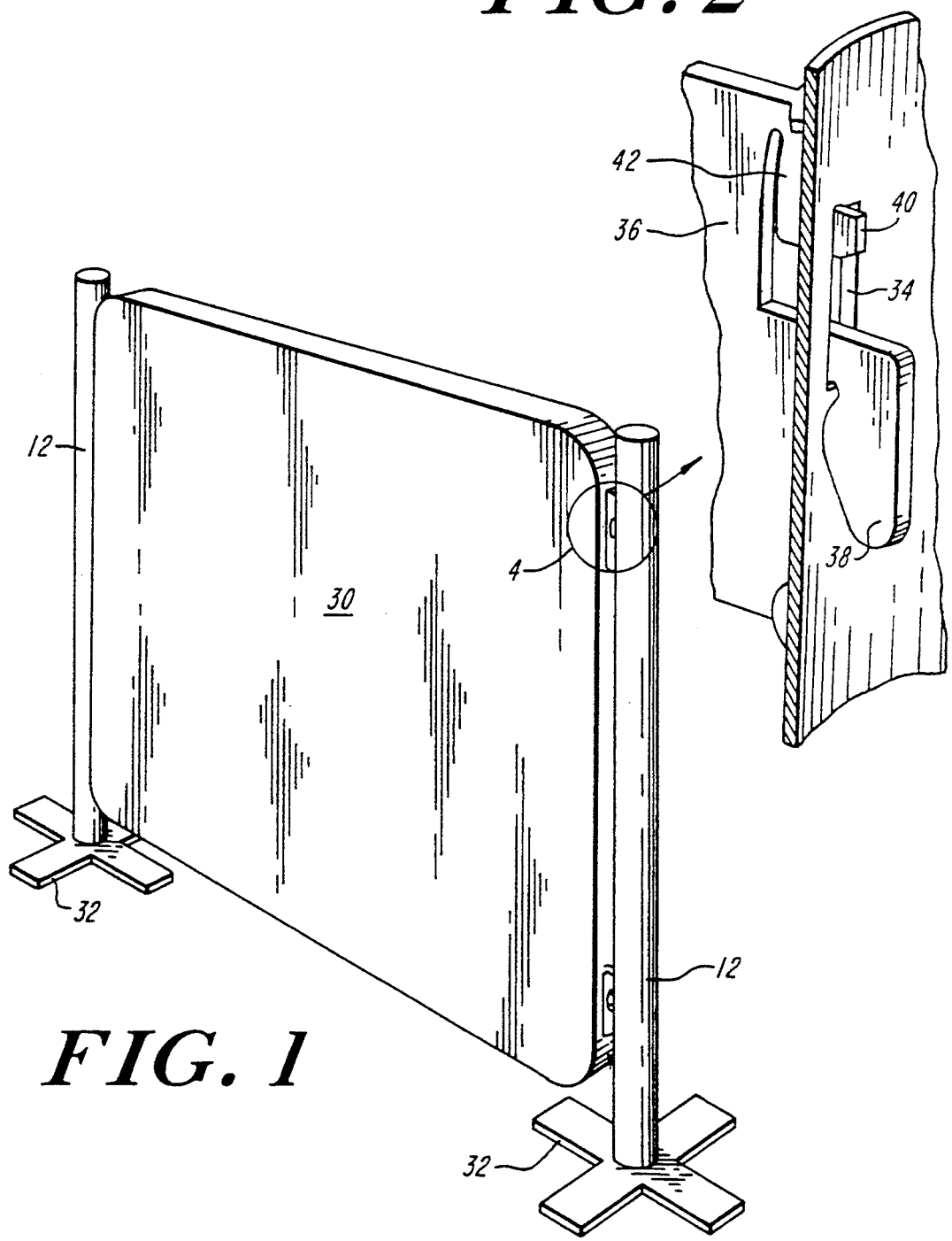

LOCKING MEANS AND PANEL ASSEMBLY INCORPORATING SUCH LOCK MEANS

TECHNICAL FIELD

This invention is directed to a panel attachment system, and in particular to hooked attachment systems incorporating stabilizing means.

BACKGROUND ART

In the assembly of displays and partitions much use is made of hooking attachment brackets, secured to a display panel or a partition panel, in combination with special hollow posts to which the panels are secured.

Owing to the need for rigid, reliable assembly, it has been the practice to use hook members secured to the panel means, and adapted for rapid and accurate attachment to division poles, permitting the ready erection of both planar and multi-dimensional displays, panels and partitions.

One such prior art system is shown in U.S. Pat. No. 4,134,564, Jan. 16, 1979.

In the prior arrangement shown in the above-identified patent, the simple suspension hook members by which the panels are suspended are each inserted into a slot in the wall of a supporting post, the post generally being of circular section.

The adoption of high strength engineering plastic materials such as the polycarbonates, in the die casting of panel attachment plates, has been hindered by undue lateral flexibility of the slender die-cast plate components.

Thus, while possessing fully adequate strength to transfer the weight of the attachment panel to its supporting post, the flexible support plate imparts such lateral flexibility to the system that a row of thus secured panels can be readily caused to sway to an unacceptable extent.

The use of a friction-dependent panel support plate load transfer system wherein a hook portion of a panel support plate is frictionally engaged within a slotted post by the application of reaction force between the post and an edge portion of the plate as an external location, has not been feasible, due to variations in manufacture: in the thickness of the post tube wall, the thickness of paint coatings on the tube outer surface, and the manufacturing tolerances arising in the die casting of the hooked support plate.

These manufacturing variations preclude the ability to provide a reasonably constant reaction load to generate a requisite friction force between the plate hook portion and the interior surface of the post.

In the event that the plate dimensions of known prior systems are so restricted as to ensure adequate interference between the post and the plate contact points, for the sure provision of suitable reaction force loading, in order to achieve an effective range of friction force, then such loading may be excessive, so as to cause undue wear of the plate contact points. Thus, after a number of re-assemblies sufficient wear may occur that the reaction force loading becomes ineffective or even totally lost.

DISCLOSURE OF THE INVENTION

The present invention provides a new integral attachment means for securing two members in joined relation and an assembly including new locking means.

In one embodiment there is provided a first support member having a wall portion; a slot of limited length extending therethrough; a second plate member having a projecting hook portion for insertion within the slot, the hook portion being shaped to permit displacement of the hook along the slot into engaging relation with a portion of the wall adjoining one end of the slot; stop means extending from the plate member in substantially aligned relation with the hook portion, for entry of the stop means into the slot, to engage the adjoining end wall portion and preclude ready withdrawal of the hook portion along the slot, for disengagement thereof from the slot.

The provision of elastically resilient portions to at least one of the system members facilitates assembly of the system components, including the insertion of the plate stop means into the slot.

In another embodiment an edge abutment portion of a panel support plate is resiliently mounted.

The portion of the support plate of which the edge abutment forms a part comprises a resilient tongue portion of the plate, such that the edge abutment may be resiliently displaced during insertion of the plate hook portion within a panel support post. The resilient mounting generates a desired reaction force at the edge abutment despite dimensional variations in the assembly that may occur as a consequence of manufacturing tolerances, differences in paint thickness, etc.

The resilient mounting of the support plate edge abutment also tends to prevent undue wear of the abutment taking place as a consequence of repeated system disassembly and re-assembly.

The foregoing improvements in panel support plates may be used in conjunction with panels having a pair of support plates glued, riveted or removably attached to the panel.

An alternative, removable support plate embodiment may be provided in combination with a slotted mounting plate attached as an edge trim to the edges of the panel. The trim plate has a deep longitudinal slot extending along its face with a series of sharp ridges on both sides of the slot, generally extending the full length of the slot.

The support plate is inserted within the slot, and may be selectively slideably located along the length of the slot. One or two grub screws, entered within recesses in the support plate threadedly engage adjoining portions of the sharp ridges of the slot sides, serving to force the support plate against the back of the slot, in secured relation therewith.

The support plate may incorporate any or all of the above disclosed hook attachment improvements.

The adoption of high strength engineering plastics for panel support plates enables the Use of a thinner plate. used in conjunction with existing panel support posts having slots of standard width, this provides the capability to incline panels at intermediate angles, thereby extending the useful range of the system.

The high strength and elasticity of the panel support plates enables them to be bent, when in use, to further extend the range of positionability of the panels, and their support posts.

The panel support plates also may be shortened at top or bottom, for special situations.

The invention further provides removable attachment means, in combination with supporting posts, and having partition means suspended thereby, in total combination.

BRIEF DESCRIPTION OF DRAWINGS

Certain embodiments of the invention are described by way of illustration, without limitation of the invention thereto, reference being made to the accompanying drawings, wherein;

FIG. 1 is a perspective view of a free standing panel assembly incorporating a two-piece attachment system in accordance with the present invention;

FIG. 2 is an enlarged portion 2 of FIG. 3, showing portions of the hook and post;

BEST MODE OF CARRYING OUT THE INVENTION

Figure 3:
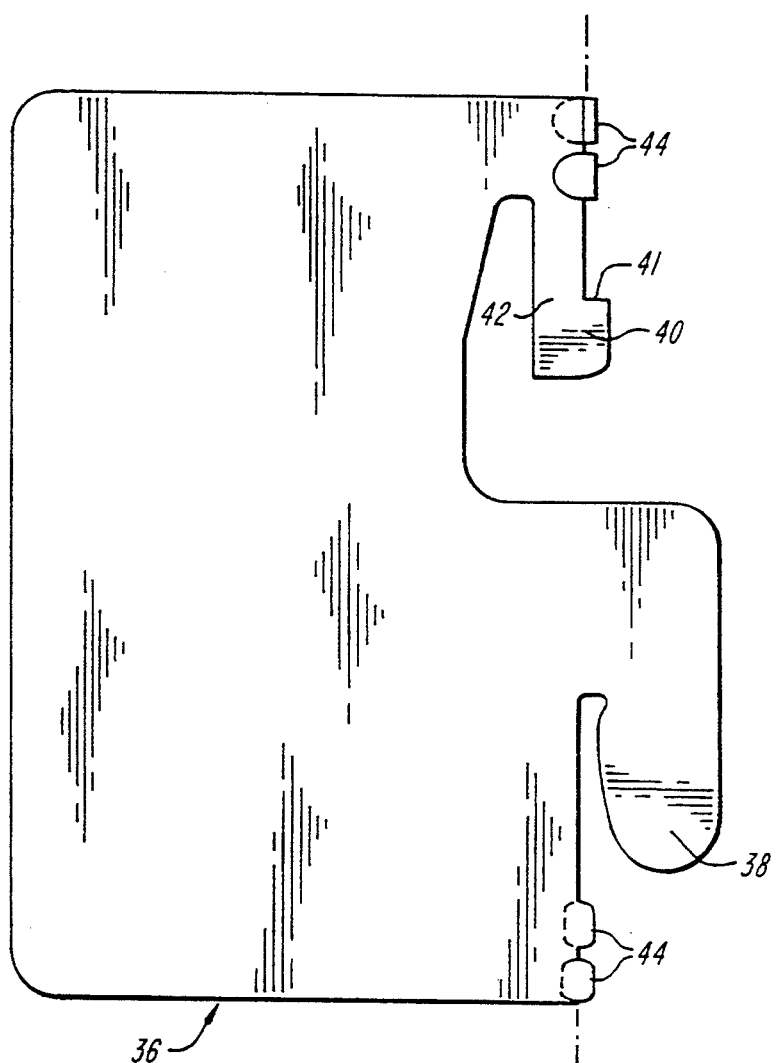
FIG. 3 is a side view of a locking embodiment of hook component of the present invention.

Referring to FIGS. 1 and 2, a partition or display panel 30 is supported between a pair of posts 12, having foot portions 32. Four support plates 36 secure the corners of panel 30 to the posts 12. The hook portion 38 of plate 36 (FIG. 2) engages the interior surface within post 12 adjacent slot 34. A stop means 40 mounted upon arm 42 and forming a portion of plate 36 is entered within and engages the top end of slot 34, to preclude upward displacement hook portion 38 from its engaged position. The square shoulder portion 41 (see FIG. 3) of stop means 40 constitutes a permanent lock, unless withdrawn externally. This may be accomplished by an externally applied pry tool, inserted between post 12 and arm 42.

Figure 4:
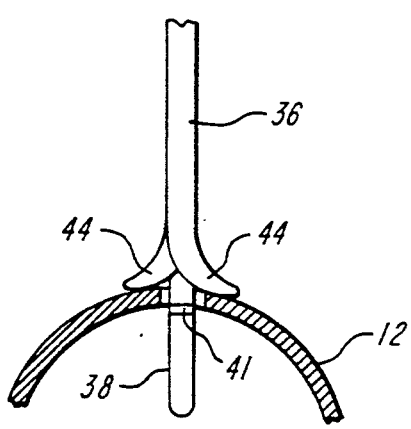
FIG. 4 is a plan view of the FIG. 3 component in assembled relation with a slotted post.

Referring to FIGS. 3 and 4, resilient side tabs 44 bear, in use, against the outer surface of post 12, serving to provide resilient loading between the plate 36 and post 12. The tabs 44 also stabilize the support plate 36 laterally thereby stabilizing the panel 30 relative to the post 12 and the adjoining panel 12.

Figure 5:
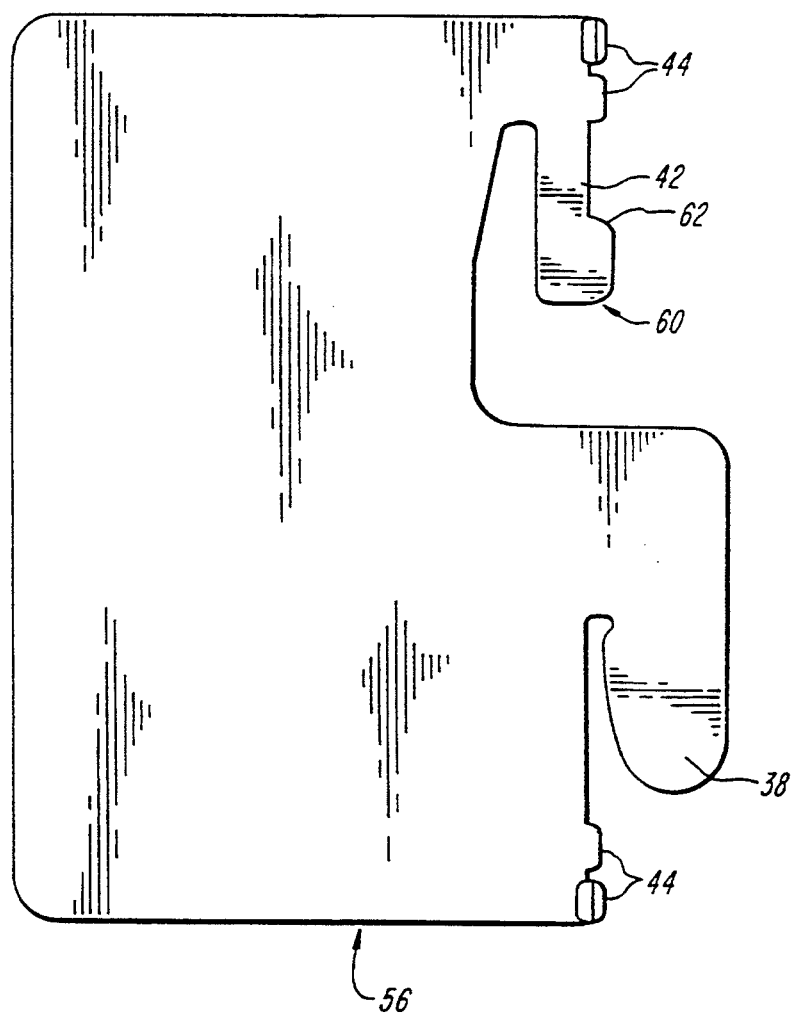
FIG. 5 is a side view of a locking embodiment of hook component incorporating an unlocking provision, and a resilient plate abutment mounting arrangement.

Referring to FIG. 5, the support plate 56 incorporates stop means 60, mounted upon resilient arm 42. The stop means 60 incorporates a curved upper cam surface 62.

In use, upon insertion of stop means 60 into a slot 34 of a post, the cam surface 62 abuts the top end of slot 34, to preclude normal sliding displacement of hook 38 upwardly in a withdrawal motion from the post slot.

Upon the application of an upward impact force plate 56, the cam surface 62 engages the top end of slot 34, thereby displacing by its camming action stop means 60 outwardly through the slot 34. This release of stop means 60 from the slot 34 then permits the continued upward and outward withdrawal of the support plate 56 from slot 34, and the disassembly of the associated panel ensemble from its supporting post.

The total resilience of the system is made up of the resilient arm 42, complemented by the resilience of the side tabs 44.

Figure 6:
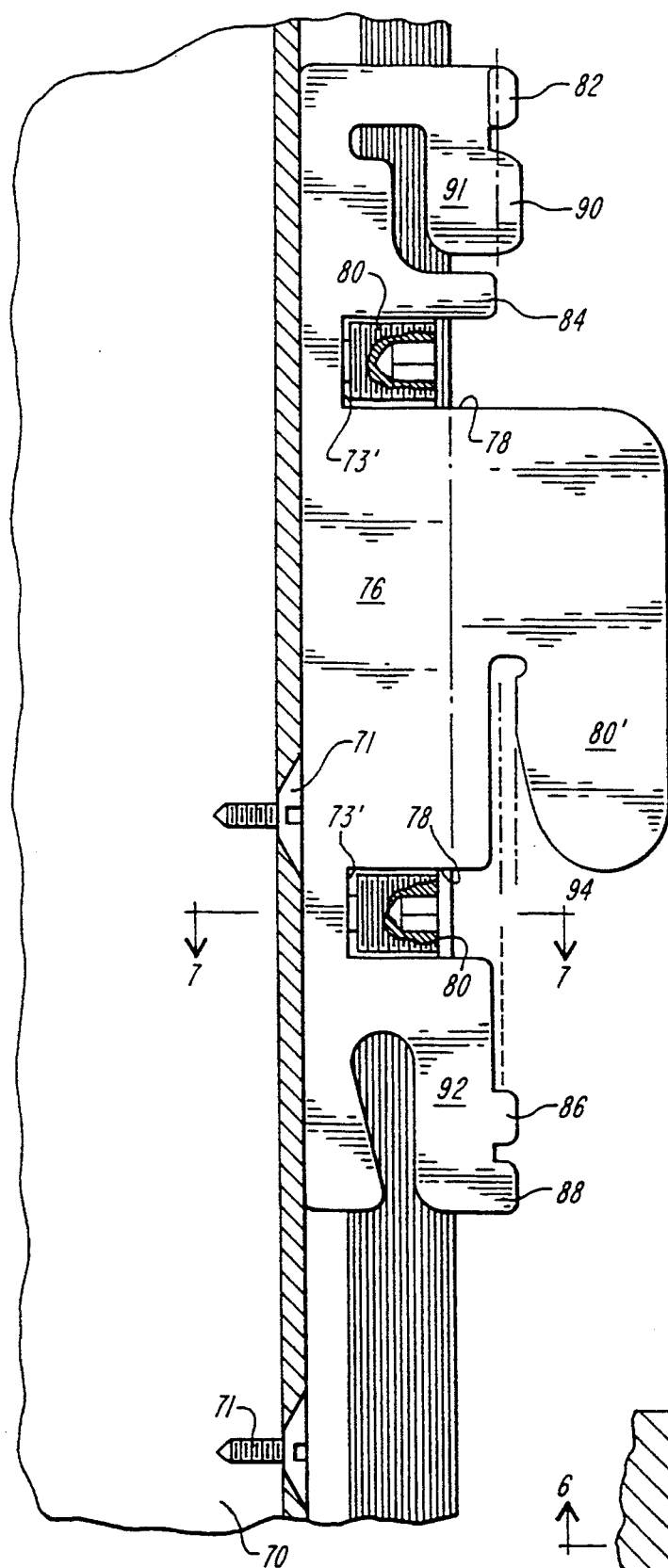
FIG. 6 is a side view of a track mounted panel support plate embodiment, taken at 6—6 of FIG. 7.
Figure 7:
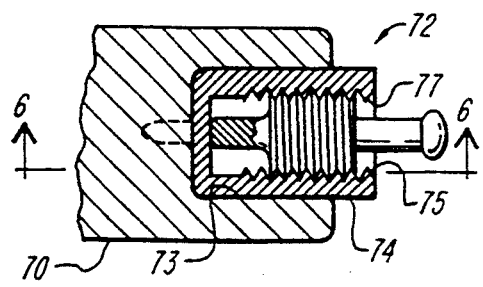
FIG. 7 is a plan view, in section, of the track mounted support plate embodiment, taken at 7—7 of FIG. 6.

Referring to FIGS. 6 and 7, a corner portion of a panel 70 is shown having a track 72 of U-section secured within a recess 73 in the vertical edge of the panel 70, by way of screw fastener 71.

The track 72 is longitudinally profiled along the inner surfaces of the leg portions 74 thereof, with vee grooves 75, the intervening crests 77 of which constitute longitudinally continuous thread profiles (as seen in FIG. 7).

A support plate 76, located primarily within the U-section of track 72 has a pair of recesses 78 within which grub screws 80 are inserted.

The thread portions of grub screw 80 each engage the thread crests 77 and the bottom of grub screw 80 compresses the bottom surface 73' of a recess 78, thereby securely locking the support plate 76 to the track 72.

This arrangement permits the location of a support plate 76 at any selected location along the track 72.

The support plate 76 has a hook portion 80' thereof projecting clear of the panel 70 and the track 72. Spacing tabs 82, 84, 86 and 88, and a locking cam 90 also project clear of the panel V0 and track 72.

The spacing tabs 86 and 88 are carried upon resilient arm portion 92 of the support plate 76, permitting controlled deflecting displacement of the tabs 86 and 88, when depressed.

A wall portion 94 of a support post, shown in phantom, indicates the position occupied by hook portion 80 when entered through a slot into engagement with post wall portion 94. It will be seen that in this condition the line of the exterior surface of wall portion 94 intersects the spacing tabs 82, 84, 86 and 88. Thus, in order to insert hook portion 80, at least some of the spacing tabs 82, 84, 86 and 88 require to be deflected leftwardly towards the panel 70. In the case of spacing tabs 86 and 88 this deflection is made possible by the resilience of arm portion 92.

In the case of the remaining spacing tabs 82 and 84, these may be of the deflecting type of tab 44, shown in FIG. 4.

In the FIG. 6 embodiment it will be observed that the locking cam 90 also is flexibly mounted upon an arm portion 91 of the support plate 76.

The resilience of arm portion 91 facilitates the entry and the withdrawal of locking cam 90 into and from the slotted support post portion 94.

Thus, the upward force application required to unlock the hook portion 80 and permit withdrawal of the panel 70 from post portion 94 is modified by the resilience of the arm portion 91, on which the locking cam 90 is carried.

In addition to modifying the requisite assembly and dis-assembly forces required in mounting/dismounting panel 80 to a support post, the resilient arm portions 91, 92 of support plate 70 serve to reduce the loads applied to the respective spacing tabs 86, 88 and the locking/unlocking cam 90 and hence, to reduce the wearing out of the tabs.

Figure 8:
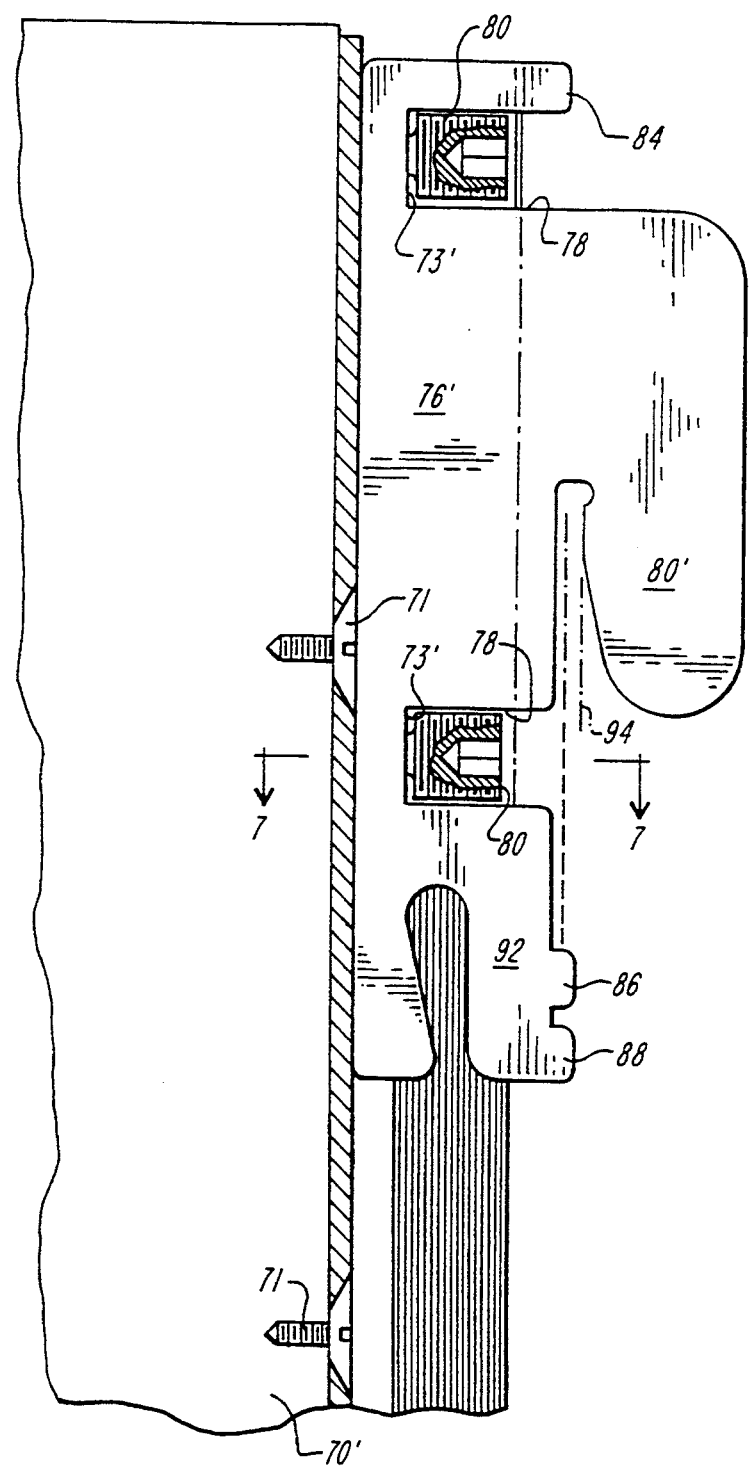
FIG. 8 is a view corresponding to FIG. 6 of a panel support plate having a shortened top portion.

Referring to FIG. 8, a shortened version of the FIG. 6 embodiment may be used, in instances where the support plate 76' is located at the top of track 72, adjacent the top edge of panel 70.

This shorter support plate 76' may be provided by removal of the top portion of support plate 76 (see FIG. 6).

The spacing tab 82 is removed along with the locking cam 90, being cut away, and leaving spacing tab 84 in place, to provide the desired functions.

Figure 9:
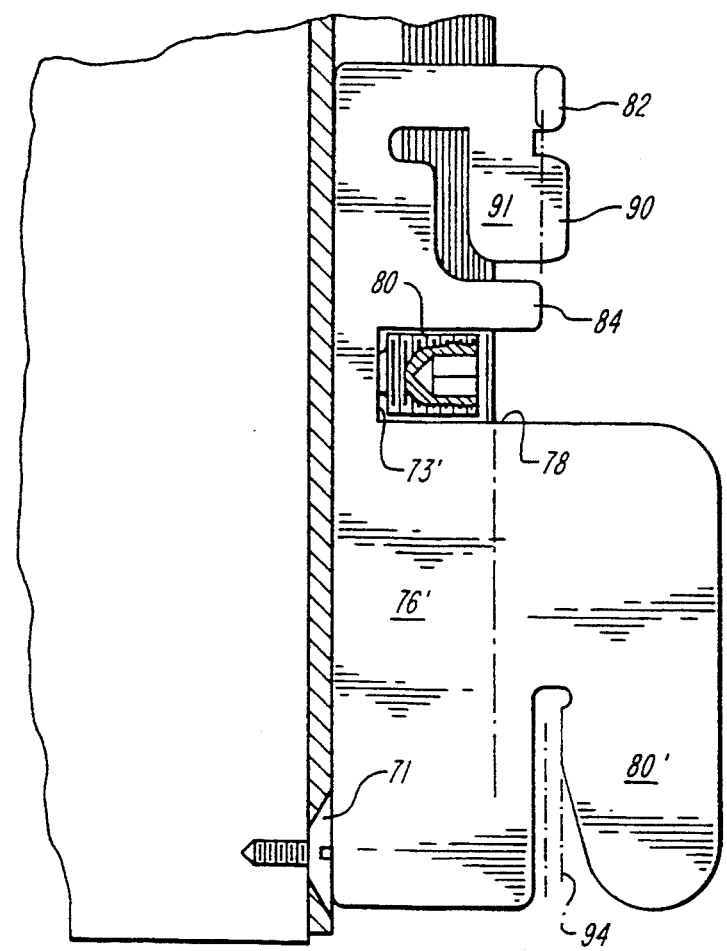
FIG. 9 is a view corresponding to FIG. 6 of a panel support plate having a shortened bottom portion.
Figure 10:
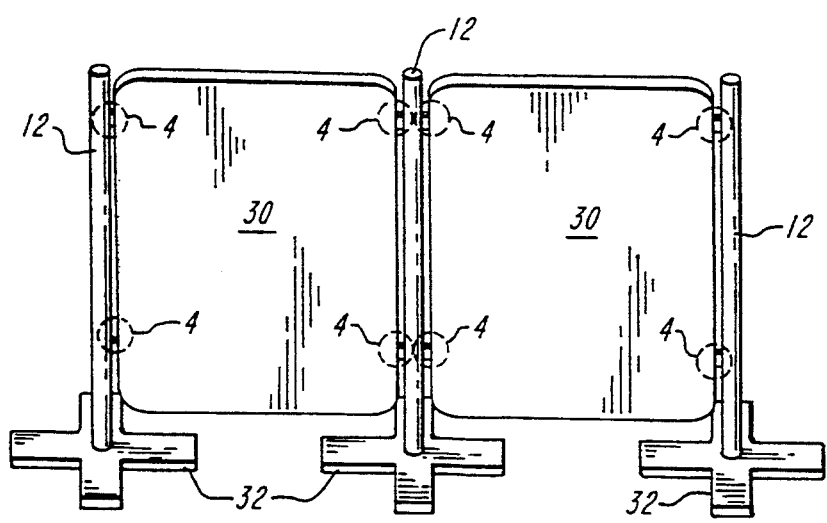
FIG. 10 is a front, elevational perspective of a plural panel and post assembly.

Referring to FIG. 9, another shortened version of the FIG. 8 embodiment may similarly provided, by shortening the support plate by severing a portion thereof in the manner shown, on the bottom end thereof (see FIG. 6).

The capability of utilizing appropriately shortened support plates provides extended flexibility to the system without the added expense of extended inventory, or the need to produce special support plates.

INDUSTRIAL APPLICABILITY

This attachment system is of particular use in sight screen assemblies for office partitioning, free standing visual displays and the like.

What is claimed by Letters Patent of the U.S. is:

1. An attachment system having a slotted support post; at least one slot of predetermined length and width penetrating a wall portion of the post and extending parallel with the main axis of the post; a support plate for attachment of an upright panel to the post, said plate having a hook portion for insertion within the post, through the slot, to engage an interior surface of the post adjacent the slot; and at least one flexible restraint means secured to the support plate, to engage the post in restraining relation thereagainst each said restraint means including two contact pads extending laterally, on opposite sides of said support plate, in resilient, attached relation thereto, in use to form with said hook a triangulated, lateral away restraint relative to said post and said panel, to reduce lateral swaying of said panel relative to the post.

2. The attachment system as set forth in claim 1, said restraint means including a locking tab extending gin the plane of said plate for entry within said slot, to limit movement of said hook in a withdrawal sense from said slot said locking tab having an inclined upper edge cam surface portion, inwardly and downwardly inclined relative to said slot for entry partially within the slot below and adjacent the upper edge of the slot, to preclude normal withdrawal of the hook portion upwardly along the slot; the locking tab being mounted on a resilient, cantilevered edge portion of the plate whereby an upward application of a moderate impact to said plate said cam edge is forced outwardly of said slot, to clear said locking tab from the slot and permit withdrawal of the hook portion from the slot.

3. The attachment system as set forth in claim 1, said restraint means including at least one resilient, cantilevered edge portion of said plate having a said contact pad mounted thereon, to enable deflection of said contact pad towards said plate, substantially in the plane of the plate.

4. The attachment system as set forth in claim 1, said support plate having a thickness substantially less than the width of said slot, to permit lateral canting of said support plate within said slot.

5. The attachment system as set forth in claim 1, said support plate being of engineering plastic of sufficient thickness to facilitate safe lateral bending thereof in a load supporting mode.

6. The attachment system as set forth in claim 1 in combination with a plurality of panels and posts in secure attached relation therewith by way of a plurality of said support plates.

7. The attachment system as set forth in claim 1, said support plate including one said restraint means located in spaced relation from the top of said support plate, to enable removal of a top portion of the plate while retaining said one restraint means adjacent thereto.

8. The attachment system as set forth in claim 1, said support plate having a recess in an outer edge thereof, to receive a grub screw in entered, securing relation therein, wherein in use said grub screw bears in securing relation against side portions of said recess.

9. The attachment system as set forth in claim 8, said support plate having one said recess for a said grub screw, located above said hook portion, and another said recess for a said grub screw located below said hook portion, to permit elective shortening of said plate by removal of an upper or a lower portion of said plate containing a said recess, while leaving the other said recess to receive said grub screw in secured relation therein.

* * * * *

UNITED STATES PATENT AND TRADEMARK OFFICE
CERTIFICATE OF CORRECTION

PATENT NO. : 5,351,740
DATED : October 4, 1994
INVENTOR(S) : RONALD DAVID HANNA

It is certified that error appears in the above-indentified patent and that said Letters Patent is hereby corrected as shown below:

Column 2, line 54, "Use" should read --use--.

Column 2, line 55, "used" should read --Used--.

Column 4, line 25, "the panel VO" should read --the panel 70--.

Column 5, line 32, "lateral away restraint" should read --lateral sway restraint--.

Column 5, line 36, "extending gin" should read --extending in--.

Signed and Sealed this

Fifth Day of September, 1995

*Attest:*

BRUCE LEHMAN

*Attesting Officer*          *Commissioner of Patents and Trademarks*